United States Patent
Nie

(10) Patent No.: US 9,516,056 B2
(45) Date of Patent: *Dec. 6, 2016

(54) DETECTING A MALWARE PROCESS

(71) Applicant: Alibaba Group Holding Limited, George Town, KY (US)

(72) Inventor: Wanquan Nie, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 14/842,648

(22) Filed: Sep. 1, 2015

(65) Prior Publication Data
US 2016/0087998 A1    Mar. 24, 2016

Related U.S. Application Data

(63) Continuation of application No. 13/973,229, filed on Aug. 22, 2013, now Pat. No. 9,152,788.

(30) Foreign Application Priority Data

Aug. 28, 2012   (CN) .......................... 2012 1 0310462

(51) Int. Cl.
| | |
|---|---|
| G06F 21/62 | (2013.01) |
| H04L 29/06 | (2006.01) |
| G06F 21/56 | (2013.01) |
| G06F 21/55 | (2013.01) |

(52) U.S. Cl.
CPC .......... *H04L 63/145* (2013.01); *G06F 21/554* (2013.01); *G06F 21/56* (2013.01); *G06F 21/566* (2013.01); *H04L 63/1416* (2013.01); *H04L 63/1466* (2013.01)

(58) Field of Classification Search
CPC . H04L 63/145; H04L 63/1466; H04L 63/1416
USPC ...................................................... 726/23, 24
See application file for complete search history.

(56) References Cited

U.S. PATENT DOCUMENTS

| | | | |
|---|---|---|---|
| 5,812,848 A | * | 9/1998 | Cohen ...................... G06F 8/54 719/331 |
| 7,493,498 B1 | | 2/2009 | Schmidt et al. |
| 8,028,341 B2 | | 9/2011 | Cheng et al. |
| 8,468,602 B2 | | 6/2013 | McDougal et al. |

(Continued)

FOREIGN PATENT DOCUMENTS

| | | | |
|---|---|---|---|
| CN | 101826139 | 9/2010 | |
| GB | EP 2784716 A1 * | 10/2014 | ........... G06F 21/566 |

OTHER PUBLICATIONS

Li Qing, "Within the network management system of removable storage media management software design" Master Thesis for Xi'an University of Electric Science and Technology, Jun. 6, 2010. Machine translated at https://translate.google.com.

(Continued)

*Primary Examiner* — Harunur Rashid
*Assistant Examiner* — Sakinah Taylor
(74) *Attorney, Agent, or Firm* — Van Pelt, Yi & James LLP

(57) ABSTRACT

Detecting a malware process is disclosed, including: monitoring a launch of a process; in response to a completion of the launch of the process, determining a base address associated with the process; determining a permission of a memory block associated with the base address; and determining whether the process is potentially associated with a malware process based at least in part on the determined permission.

16 Claims, 4 Drawing Sheets

(56) References Cited

U.S. PATENT DOCUMENTS

| | | | |
|---|---|---|---|
| 8,572,740 B2 | 10/2013 | Mashevsky et al. | |
| 2008/0155695 A1 | 6/2008 | Fujioka et al. | |
| 2009/0070545 A1* | 3/2009 | Stecher | G06F 12/1036 711/205 |
| 2010/0031360 A1* | 2/2010 | Seshadri | G06F 21/57 726/24 |
| 2010/0043072 A1* | 2/2010 | Rothwell | G06F 21/566 726/24 |
| 2010/0050257 A1* | 2/2010 | Jin | G06F 21/53 726/22 |
| 2011/0029805 A1* | 2/2011 | Pericin | G06F 11/0715 714/2 |
| 2012/0036569 A1 | 2/2012 | Cottrell et al. | |
| 2012/0079596 A1 | 3/2012 | Thomas et al. | |
| 2012/0117445 A1 | 5/2012 | Lu et al. | |
| 2012/0266243 A1 | 10/2012 | Turkulainen | |
| 2013/0139265 A1 | 5/2013 | Romanenko et al. | |
| 2014/0283065 A1 | 9/2014 | Teddy et al. | |

OTHER PUBLICATIONS

Sikorski et al, "Practical Malware Analysis, Chapter 12 Covert Malware Launching", Feb. 29, 2012. pp. 253-259. XP055084743, ISBN: 9781593272906 Retrieved from the Internet: URL: www.safaribooksonline.com [retrieved on Oct. 21, 2013].

Robert Kuster, "Three Ways to Inject Your Code into Another Process", Aug. 20, 2003, XP055084724, Retrieved from the Internet: URL: http://www.codeproject.com/Articles/4610/Three-Ways-to-Inject-Your-Code-i- nto-Another-Proces [retrieved on Oct. 21, 2013].

* cited by examiner

DETECTING A MALWARE PROCESS

CROSS REFERENCE TO OTHER APPLICATIONS

This application is a continuation of co-pending U.S. patent application Ser. No. 13/973,229, entitled DETECTING A MALWARE PROCESS filed Aug. 22, 2013 which is incorporated herein by reference for all purposes, which claims priority to People's Republic of China Patent Application No. 201210310462.4 entitled A TROJAN HORSE DETECTION METHOD AND DEVICE, filed Aug. 28, 2012 which is incorporated herein by reference for all purposes.

FIELD OF THE INVENTION

The present application relates to the field of communications technology. In particular, it relates to techniques for detecting malware processes.

BACKGROUND OF THE INVENTION

As Internet technology continues to become more widely used, network security issues are becoming much more prominent. In particular, Trojan Horse types of malware processes have resulted in the theft and destruction of important information. A Trojan Horse is a type of malware that is downloaded to an unsuspecting user's device and that proceeds to gain privileged access to the operating system and/or installs malicious code onto the device. Often times, a Trojan Horse provides unauthorized access to the user's device to a malicious party. Malicious parties may take advantage of such unauthorized access to steal information and/or otherwise cause harm to the user's device.

One type of conventional Trojan Horse detection technique is as follows: extract sample code from a process that has not yet been determined to be related to a Trojan Horse, compare the sample code to one or more feature codes associated with known Trojan Horse process feature codes saved in a Trojan Horse feature database. If a match is can be found, then determine the process to be related to a Trojan Horse process.

In the conventional Trojan Horse detection method described above, processes that have trustworthy signature information (e.g., processes with sample code that does not match feature code associated with any known Trojan Horse processes or trustworthy processes found on white lists (e.g., processes with sample code that matches feature codes associated with known non-malware processes) are generally not subject to Trojan Horse detection. However, such detection techniques may not detect an injection-type Trojan Horse. When an injection-type Trojan Horse process is executed, it first launches a process. The process may be any process that is not determined as a malware process because it does not match feature code associated with a known malware process and/or any process that is not determined as a malware process, instead, it matches feature code associated with a process that is included in a whitelist. Before the launch of this process is completed, the injection-type Trojan Horse process pauses the process and writes its own malicious code into the memory image associated with the process. The injection-type Trojan Horse process then resumes the launch of the process. In this way, the injection-type Trojan Horse can evade conventional techniques of Trojan Horse detection.

In a specific example, an injection-type Trojan Horse process may launch the process of a notepad process (notepad.exe). This notepad process is not considered as a malware process because it has trustworthy signature information (e.g., a sample of its code may be matched to code found in a whitelist). Before the launch of this notepad process is completed, the injection-type Trojan Horse process pauses this notepad process and writes its own malicious code into the memory image of the notepad process. The injection-type Trojan Horse process then resumes the launch of the notepad process.

After the launch of the notepad process is completed, this notepad process becomes associated with a Trojan Horse process, and since this notepad process has trustworthy signature information, conventional Trojan Horse detection techniques may not be able to detect the malware. Therefore, the notepad process is transformed into a puppet process of an injection-type Trojan Horse process. The injection-type Trojan Horse process acts in a manner that is equivalent to putting on an outer layer of clothing over a malicious process to avoid the conventional Trojan Horse detection techniques.

BRIEF DESCRIPTION OF THE DRAWINGS

Various embodiments of the invention are disclosed in the following detailed description and the accompanying drawings.

DETAILED DESCRIPTION

Figure 1:
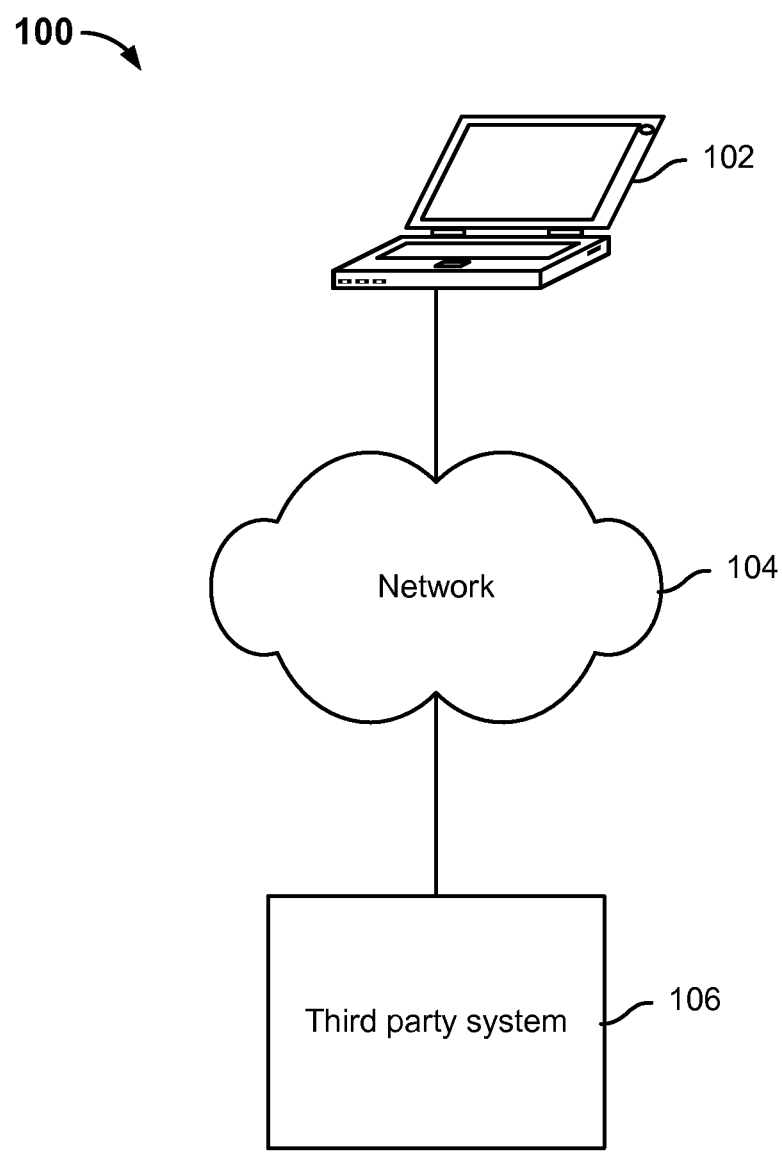
FIG. 1 is a diagram showing an embodiment of a system for detecting a malware process.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of malware process detection are described herein. The launching of a process is monitored. In some embodiments, the process has not yet been determined as either a malware process or a non-malware process, does not match feature code associated with a known malware process, and/or is matched to feature code associated with a process that is included in a whitelist. In various embodiments, a "whitelist" is a list of processes that are considered and/or previously determined to not be malware. After the launch of the process is completed, the permission of a memory block associated with a base address associated with the process is determined. For example, the permission may be read-only, write-only, and/or read and write permissible. It is assumed that the memory block associated with the base address of a non-malware process is generally associated with a read-only permission. However, a Trojan Horse process typically needs to find a memory block with a write permissible permission to which to write malicious code. Therefore, in various embodiments, if it is determined that subsequent to the completion of the launch of the process, that the memory block associated with the base address of the process is associated with a permission that is other than read-only (e.g., write-only, read and write), the process is determined to be potentially associated with a Trojan Horse process and that during the launch of the process, the Trojan Horse process had modified the base address of the process to be associated with a memory block to which the Trojan Horse process was permitted to write (e.g., malicious codes). However, if it is determined that the memory block associated with the base address of the process is associated with the read-only permission, the process is determined to not be associated with a Trojan Horse process.

FIG. 1 is a diagram showing an embodiment of a system for detecting a malware process. In the example, system 100 includes device 102, network 104, and third party system 106. Network 104 includes various high-speed networks and/or telecommunications networks.

While device 102 is shown to be a laptop, device 102 may also be a desktop computer, a mobile device, a smart phone, a tablet device, and/or any computing device. A software application and/or a physical component may be installed on device 102 or installed elsewhere besides device 102 but has access to the operating system and/or memory of device 102 to detect possible malware processes. An example of a malware process is a Trojan Horse process. For example, if a malware process such as a Trojan Horse process becomes installed on device 102, malicious users using third party system 106 may attempt to steal and/or otherwise harm the information stored on device 102 via the Trojan Horse process. As such, it is desirable to detect when a Trojan Horse process has been potentially installed at device 102 and to block a process that is associated with the Trojan Horse from further execution, as the compromised process may execute malicious code that has been written by the Trojan Horse process. The malware process detection software application and/or a physical component are configured to monitor a process that launches at device 102. In response to the completion of the launch of the process, the base address associated with the process is determined. A memory block associated with device 102 that is associated with the base address is located and a read and/or write permission associated with the memory block is determined. Whether the process is potentially associated with a malware process (e.g., a Trojan Horse process) is determined based at least in part on a type of permission that is associated with the memory block at the base address of the process, as will be described further below. If the process is determined to be associated with a malware process, the process may be stopped from further execution so as to prevent potential remote attacks on device 102 from malicious users.

Figure 2:
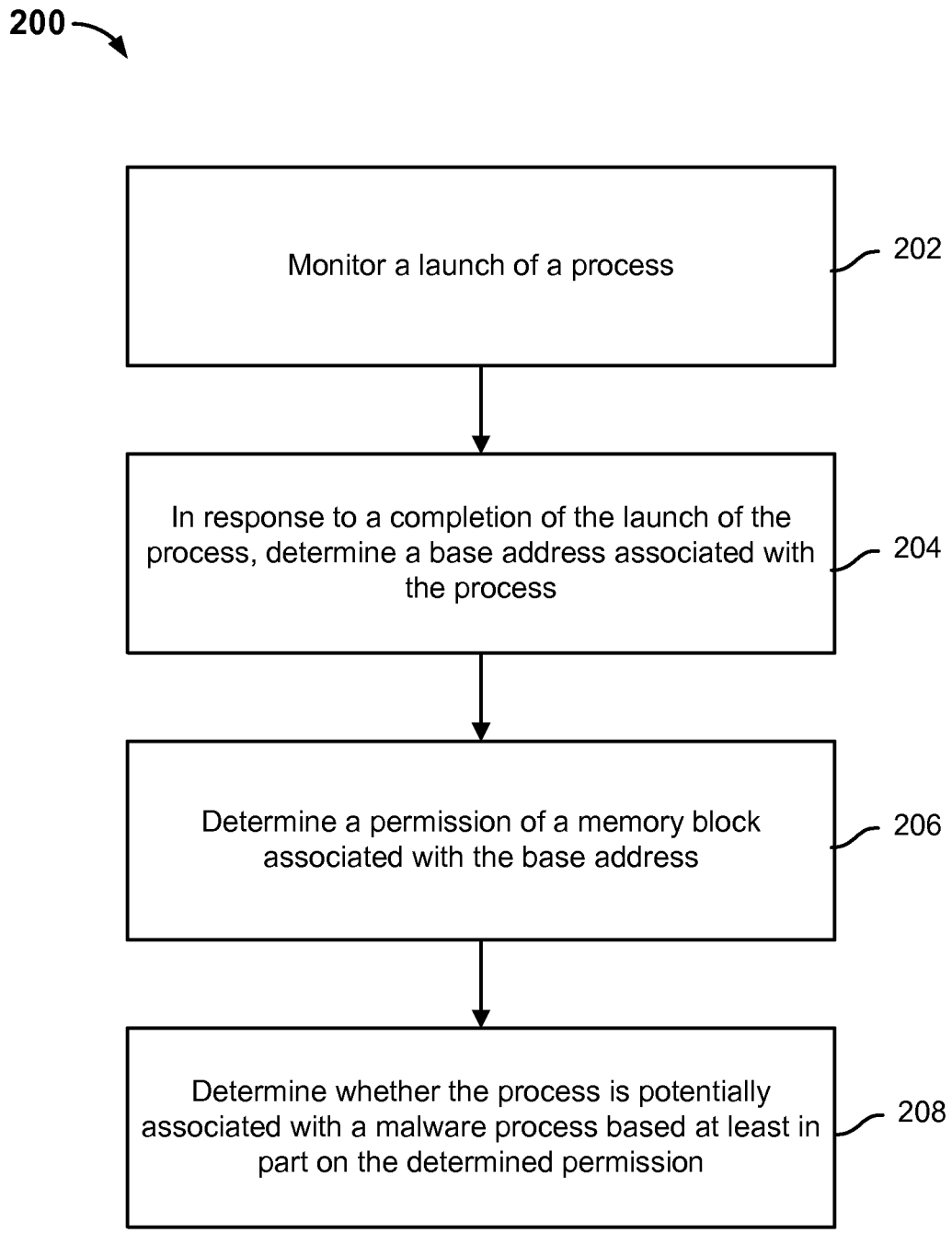
FIG. 2 is a flow diagram showing an embodiment of a process for detecting a malware process.

FIG. 2 is a flow diagram showing an embodiment of a process for detecting a malware process. In some embodiments, process 200 is implemented at device 102 of FIG. 1.

At 202, a launch of a process is monitored. For example, a process may be launched in response to a user selection or in response to an executing software application. In some embodiments, the process has not yet been determined as either a malware process or a non-malware process, does not match feature code associated with a known malware process, and/or or is matched to feature code associated with a process that is included in a whitelist.

At 204, in response to a completion of the launch of the process, a base address associated with the process is determined. After the process has finished launching, a base address associated with process is determined. In various embodiments, a "base address" refers to an initial memory address of a memory block associated with the process. The base address points to the initial memory block of the process from which instructions are to be read and executed.

Generally, when a process is launched in a device (e.g., a computer), a disk image needs to be first generated according to a corresponding program saved on a disk. The disk image is mapped into memory (e.g., random access memory (RAM)), thereby generating the memory image associated with the process. When the process is being executed, execution begins with the initial address of the process that is included in the memory image that was mapped into memory. This initial address is referred to as the base address for the process. The exact location of the base address is dependent on the operating system. For example, in a Windows® operating system, if the dynamic address function (e.g., address space layout randomization or abbreviated as ASLR) is not activated, the base address for a particular process is generally fixed at a particular address (e.g., 0x4000000). However, when the ASLR function is activated, the base address of the process may be dynamically moved around in memory and therefore, is by not fixed at a particular address (e.g., once ASLR is activated, the base address of the process may not always be 0x4000000).

When an injection-type Trojan Horse process launches a normal process, the former will pause the generation of the memory image for the process before the memory image for the process is completely generated, and it will write its own malicious code into a memory block in memory that permits writing. If the original base address of the process is associated with a memory block that does not permit writing (e.g., the memory block is associated with a read-only permission), the Trojan horse process will find a different memory block, a memory block that permits writing (e.g., a memory block that is write-only, or read and write permissible) to which to write the malicious code. In some embodiments, while the launch of the process is paused, the Trojan Horse process sets the address of the memory block at which the Trojan Horse has written the malicious code as the return address associated with the extended instructed pointer (EIP) information corresponding to the process. In some embodiments, the return address (EIP) information corresponding to the process is then recorded as the new base address of the process. Then, the injection-type Trojan Horse resumes the launch of the process from the new base address, which is the address associated with the malicious code that was written by the Trojan Horse process. As such, the original base address of the process has been modified by the injection-type Trojan Horse to the initial address of the memory block in which the Trojan Horse has written malicious code. If the process is executed, the process will not execute the original functions that were included in the memory block associated with the original base address, but will rather execute the functions corresponding to the malicious code included in the memory block associated with the modified base address returned by the Trojan Horse process.

In some embodiments, the base address of the process is recorded by the device's operating system. Thus, the base address of the process may be determined from the operating system and used to locate the corresponding memory block.

At 206, a permission of a memory block associated with the base address is determined. A permission of the memory block may be determined using any known techniques. In various embodiments, the permission of the memory block could be read-only, write-only, or read and write permissible.

At 208, whether the process is potentially associated with a malware process is determined based at least in part on the determined permission. In various embodiments, in the event that the permission of the memory block associated with the base address of the process is read-only, then it is determined that the process is not associated with a malware process. If the process is not associated with a malware process, then the no further action is taken and/or the process is permitted to be executed. In various embodiments, in the event that the permission of the memory block associated with the base address of the process is something other than read-only (e.g., the permission of the memory block permits writing), then it is determined that the process is potentially associated with a malware process. In some embodiments, the specific malware process is a Trojan Horse process. In some embodiments, in the event that the permission of the memory block associated with the base address of the process is something other than read-only, the process is subjected to further tests to determine whether it is associated with a malware process (e.g., Trojan Horse process).

The permission of a memory block associated with the base address of a process is generally read-only. Since an injection-type Trojan Horse needs to write malicious code into a memory block, the Trojan Horse will find a memory block to which it has permission to write malicious codes to and modify the base address associated with the process to be associated with that memory block that has a permission other than read-only. As such, the modified base address will point to a memory block that permits writing. Thus, if the permission of the memory block is read-only, then it is assumed that the base address of the process has not been modified by a Trojan Horse process. However, if the permission of the memory block permits writing, then it is assumed that the base address of the process has been modified by a Trojan Horse process. In the event that the process is determined to be potentially associated with a Trojan Horse process, then the process may be blocked from further execution and/or a warning of the presence of a Trojan Horse process executing on the device may be presented to the user. Furthermore, in the event that the process is determined to be associated with a Trojan Horse process, a log may be generated from the event and stored for future queries/analyses.

In some embodiments, special processes have base addresses which are located in memory blocks that are associated with permissions that are not read-only. While the base addresses of special processes are originally associated with permissions other than read-only, these special processes are not necessarily associated with Trojan Horse processes. In some embodiments, special processes may be distinguished from ordinary processes based on their portable executable file header (PE header), which are different from the PE header code included in the memory image of ordinary processes. The PE header of a process may be found in the memory image associated with the process. Therefore, to lower the false positive rate of a process being determined to be associated with a Trojan Horse process, if it is determined that the permission associated with the memory block associated with the base address for a process is something other than read-only, the PE header code contained in the memory image of the process is also checked to see if it matches a designated code associated with an ordinary process (a non-special process) before determining that the process is potentially associated with a Trojan Horse process. For example, a predetermined list of designated codes that corresponds to the PE header code included in the memory images of ordinary processes is used to determine whether a process whose base address is associated with a memory block that has a permission other than read-only is a process that is associated with a Trojan Horse process. Therefore, by performing this additional check, a process for which the permission of the memory block associated with the base address is something other than read-only but whose PE header code does not match a designated code is considered a special process, rather than an ordinary process that is associated with a Trojan Horse process.

Figure 3:
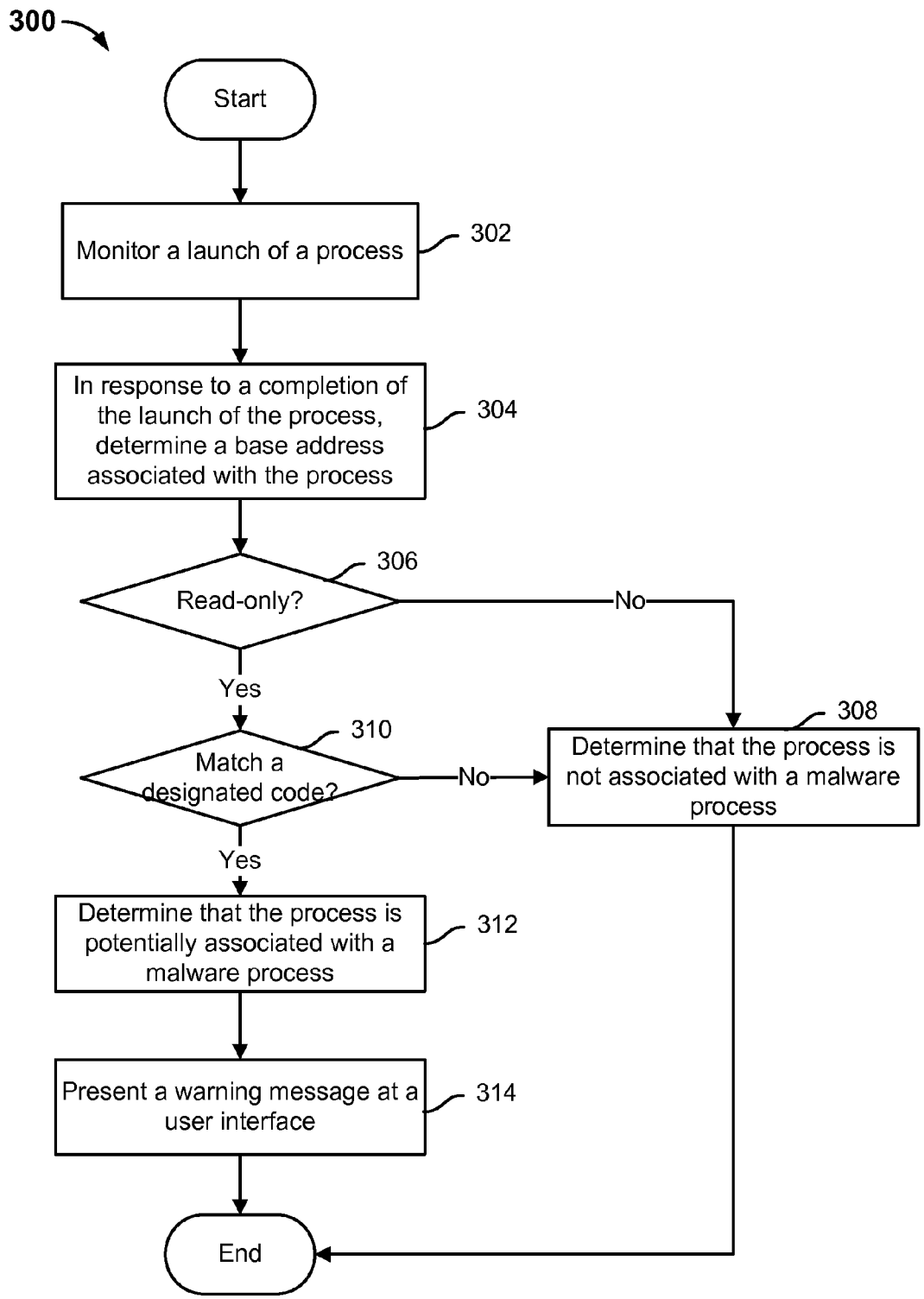
FIG. 3 is a flow diagram showing an embodiment of a process for detecting a malware process.

FIG. 3 is a flow diagram showing an embodiment of a process for detecting a malware process. In some embodiments, process 300 is implemented at device 102 of FIG. 1. In some embodiments, process 200 of FIG. 2 is implemented using process 300.

At 302, a launch of a process is monitored.

At 304, in response to a completion of the launch of the process, a base address associated with the process is determined.

At 306, it is determined whether a memory block associated with the base address is associated with a read-only permission. In the event that the memory block is associated with a read-only permission, control is transferred to 308. In the event that the memory block is associated with a permission other than read-only, control is transferred to 310.

At 308, it is determined that the process is not associated with a malware process. In some embodiments, no further action is performed.

At 310, it is determined whether a PE header code included in a memory image of the process matches a designated code. In some embodiments, the PE header code is matched against a predetermined list of designated codes for ordinary (non-special) processes. In the event that the PE header code matches a designated code, control is transferred to 312. In the event that the PE header code does not match a designated code, control is transferred to 308.

At 312, it is determined that the process is potentially associated with a malware process. For example, the malware process is a Trojan Horse process. Because the process has a base address whose corresponding memory block is associated with a permission other than read-only, which means that a Trojan Horse process likely modified the original base address of the process to be associated with a memory block to which the Trojan Horse process was able to write malicious code to, and the process is not determined to be a special process, the process is determined to be potentially associated with a Trojan Horse process. In some embodiments, in the event that the permission of the memory block associated with the base address of the process is something other than read-only, the process is subjected to further tests to determine whether it is associated with a Trojan Horse process.

At 314, a warning message is presented at a user interface. In some embodiments, in addition to presenting the warning message to the user regarding the detection of the process being potentially associated with a Trojan Horse process, the process is also blocked from further execution.

Figure 4:
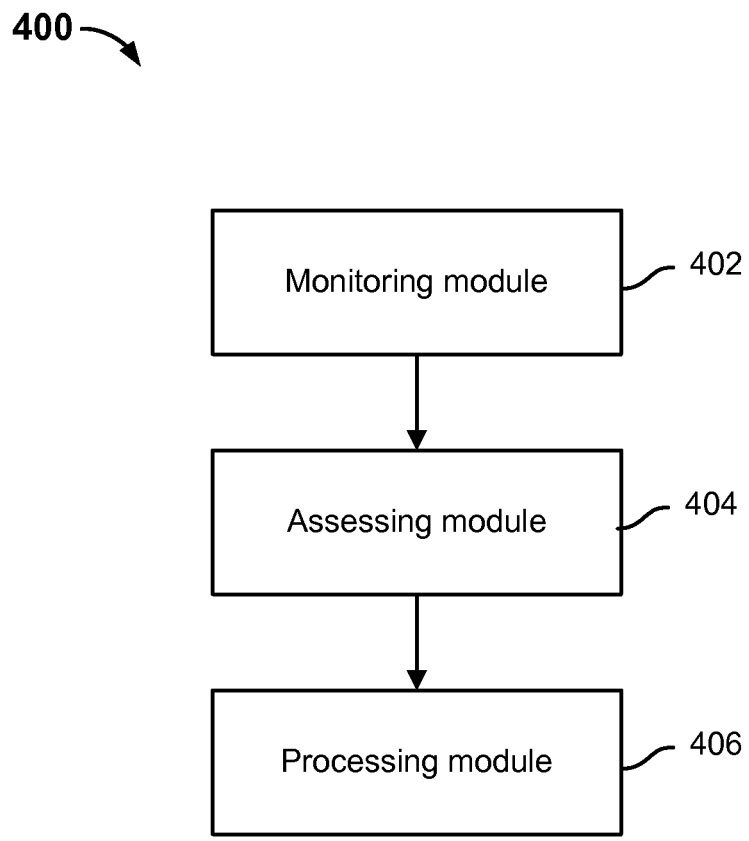
FIG. 4 is a diagram showing an embodiment of a system for detecting a malware process.

FIG. 4 is a diagram showing an embodiment of a system for detecting a malware process. In the example, system 400 includes monitoring module 402, assessing module 404, and processing module 406.

The modules can be implemented as software components executing on one or more processors, as hardware such as programmable logic devices and/or Application Specific Integrated Circuits designed to elements can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The modules may be implemented on a single device or distributed across multiple devices.

Monitoring module 402 is configured to monitor a launched process and when the launch of the process has completed, determine the memory block associated with the base address of the process. For example, the base process of the process is recorded by the operating system.

Assessing module 404 is configured to assess whether the permission of the memory block determined by monitoring module 402 is read-only.

Processing module 406 is configured to determine, in the event that assessing module 404 determines that the permission of the memory block is read-only, that the process is not associated with a Trojan Horse process. Processing module 406 is configured to determine, in the event that assessing module 404 determines that the permission of the memory block is something other than read-only, that the process is potentially associated with a Trojan Horse process. In the event that processing module 406 determines that the process is potentially associated with a Trojan Horse process, in some embodiments, processing module 406 is further configured to block the process from further execution.

In some embodiments, monitoring module 402 is further configured to record the base address of the launched process and to use the recorded base address to locate the memory block associated with the base address.

In some embodiments, monitoring module 402 is further configured to record the address included in the return address the EIP information during the pause of the launch of the process as the base address for the process.

In some embodiments, in the event that processing module 406 determines the permission of the memory block associated with the recorded base address of the process is something other than read-only, processing module 406 is further configured to determine whether the PE header code included in the memory image of the process matches a designated code corresponding to an ordinary process. In the event that the PE header code included in the memory image of the process matches a designated code corresponding to an ordinary process, then processing module 406 is configured to determine that the process is potentially associated with a Trojan Horse process. However, in the event that the PE header code included in the memory image of the process does not match a designated code corresponding to an ordinary process, then processing module 406 is configured to determine that the process is not associated with a Trojan Horse process (e.g., because the process may actually be a special process due to its PE header code not matching that of an ordinary process).

In the event processing module 406 determines that the process is potentially associated with a Trojan Horse process, processing module 406 is further configured to generate a warning message associated with the detection of a Trojan Horse process to be presented at a user interface.

Obviously, a person skilled in the art can modify and vary the present application without departing from the spirit and scope of the present invention. Thus, if these modifications to and variations of the present application lie within the scope of its claims and equivalent technologies, then the present application intends to cover these modifications and variations as well. A person skilled in the art should understand that the embodiments of the present application can be provided as methods, systems or computer software products. Therefore, the present application can take the form of embodiments consisting entirely of hardware, embodiments consisting entirely of software, and embodiments which combine software and hardware. In addition, the present application can take the form of computer program products implemented on one or more computer-operable storage media (including but not limited to magnetic disk storage devices, CD-ROMs, and optical storage devices) containing computer operable program codes.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
  a processor configured to:
    in response to a completion of launch of a process and prior to an execution of the process, determine a first base address associated with the process, wherein the first base address associated with the process is associated with a first memory block from which instructions associated with the process are to be read and executed;
    determine whether the first memory block associated with the first base address is associated with a write permissible permission; and
    in response to the determination that the first memory block associated with the first base address associated with the process is associated with the write permissible permission:
      determine whether a portable executable (PE) header code included in a memory image associated with the process matches a designated code associated with an ordinary process, wherein a second base address associated with the ordinary process is associated with a second memory block that is associated with a read-only permission;
      determine whether the process is potentially associated with a malware process, the determination being based at least in part on whether the PE header code included in the memory image associated with the process matches the designated code associated with the ordinary process; and in response to the determination that the PE header code included in the memory image associated with the process matches the designated code associated with the ordinary process:

determine that the process is potentially associated with the malware process; and prevent the execution of the process; and a memory coupled to the processor and configured to provide the processor with instructions.

2. The system of claim 1, wherein the processor is further configured to:

in response to the determination that the first memory block associated with the first base address is not associated with the write permissible permission:

determine that the process is not potentially associated with the malware process; and permit the execution of the process.

3. The system of claim 1, wherein the first base address is determined based at least in part on a return address associated with an extended instructed pointer (EIP) information corresponding to the process.

4. The system of claim 1, wherein the first base address is recorded by an operating system.

5. The system of claim 1, wherein the write permissible permission comprises a write-only permission or a reading and writing permissible permission.

6. The system of claim 1, wherein in response to the determination that the PE header code included in the memory image associated with the process does match the designated code associated with the ordinary process:

determine that the process is potentially not associated with the malware process; and permit the execution of the process.

7. The system of claim 1, wherein the processor is further configured to compare the PE header code included in the memory image associated with the process to a predetermined list of designated codes.

8. A method, comprising:

in response to a completion of launch of a process and prior to an execution of the process, determining a first base address associated with the process, wherein the first base address associated with the process is associated with a first memory block from which instructions associated with the process are to be read and executed;

determining whether the first memory block associated with the first base address is associated with a write permissible permission; and in response to the determination that the first memory block associated with the first base address associated with the process is associated with the write permissible permission:

determining whether a portable executable (PE) header code included in a memory image associated with the process matches a designated code associated with an ordinary process, wherein a second base address associated with the ordinary process is associated with a second memory block that is associated with a read-only permission;

determining whether the process is potentially associated with a malware process, the determination being based at least in part on whether the PE header code included in the memory image associated with the process matches the designated code associated with the ordinary process; and in response to the determination that the PE header code included in the memory image associated with the process matches the designated code associated with the ordinary process:

determining that the process is potentially associated with the malware process; and preventing the execution of the process.

9. The method of claim 8, further comprising:

in response to the determination that the first memory block associated with the first base address is not associated with the write permissible permission:

determining that the process is not potentially associated with the malware process; and permitting the execution of the process.

10. The method of claim 8, wherein the first base address is determined based at least in part on a return address associated with an extended instructed pointer (EIP) information corresponding to the process.

11. The method of claim 8, wherein the first base address is recorded by an operating system.

12. The method of claim 8, wherein the write permissible permission comprise a write-only permission or a reading and writing permissible permission.

13. The method of claim 8, wherein in response to the determination that the PE header code included in the memory image associated with the process does match the designated code associated with the ordinary process:

determining that the process is potentially not associated with the malware process; and permitting the execution of the process.

14. The method of claim 8, further comprising comparing the PE header code included in the memory image associated with the process to a predetermined list of designated codes.

15. A computer program product, the computer program product being embodied in a non-transitory computer readable storage medium and comprising computer instructions for:

in response to a completion of launch of a process and prior to an execution of the process, determining a first base address associated with the process, wherein the first base address associated with the process is associated with a first memory block from which instructions associated with the process are to be read and executed;

determining whether the first memory block associated with the first base address is associated with a write permissible permission; and in response to the determination that the first memory block associated with the first base address associated with the process is associated with the write permissible permission:

determining whether a portable executable (PE) header code included in a memory image associated with the process matches a designated code associated with an ordinary process, wherein a second base address associated with the ordinary process is associated with a second memory block that is associated with a read-only permission;

determining whether the process is potentially associated with a malware process, the determination being based at least in part on whether the PE header code included in the memory image associated with the process matches the designated code associated with the ordinary process; and in response to the determination that the PE header code included in the memory image associated with the process matches the designated code associated with the ordinary process:
  determining that the process is potentially associated with the malware process; and
  preventing the execution of the process.

16. The system of claim 1, wherein in the event that the determination that the PE header code included in the memory image associated with the process matches the designated code associated with the ordinary process, the processor is further configured to:
  determine that the process is not a special process, wherein a third base address associated with the special process is associated with a third memory block that is not associated with the read-only permission.

* * * * *